MAUJ A COHLY
JAMES W SANNER
INVENTOR.

3,512,997
EXTRUSION OF MICROPOROUS
COLLAGEN ARTICLES
Mauj A. Cohly and James W. Sanner, Danville, Ill., assignors to Tee-Pak, Inc., Chicago, Ill., a corporation of Illinois
Filed Sept. 29, 1966, Ser. No. 583,052
Int. Cl. A23l 3/00; A22c 13/00
U.S. Cl. 99—175                 3 Claims

ABSTRACT OF THE DISCLOSURE

A method of producing collagen articles such as casings, films or sheets whereby after extrusion, coagulation and tanning, the article is contacted with a carbonate or bicarbonate solution which reacts with the residual acid in the coagulated and tanned article to impart microporosity to it.

---

Figure 1:
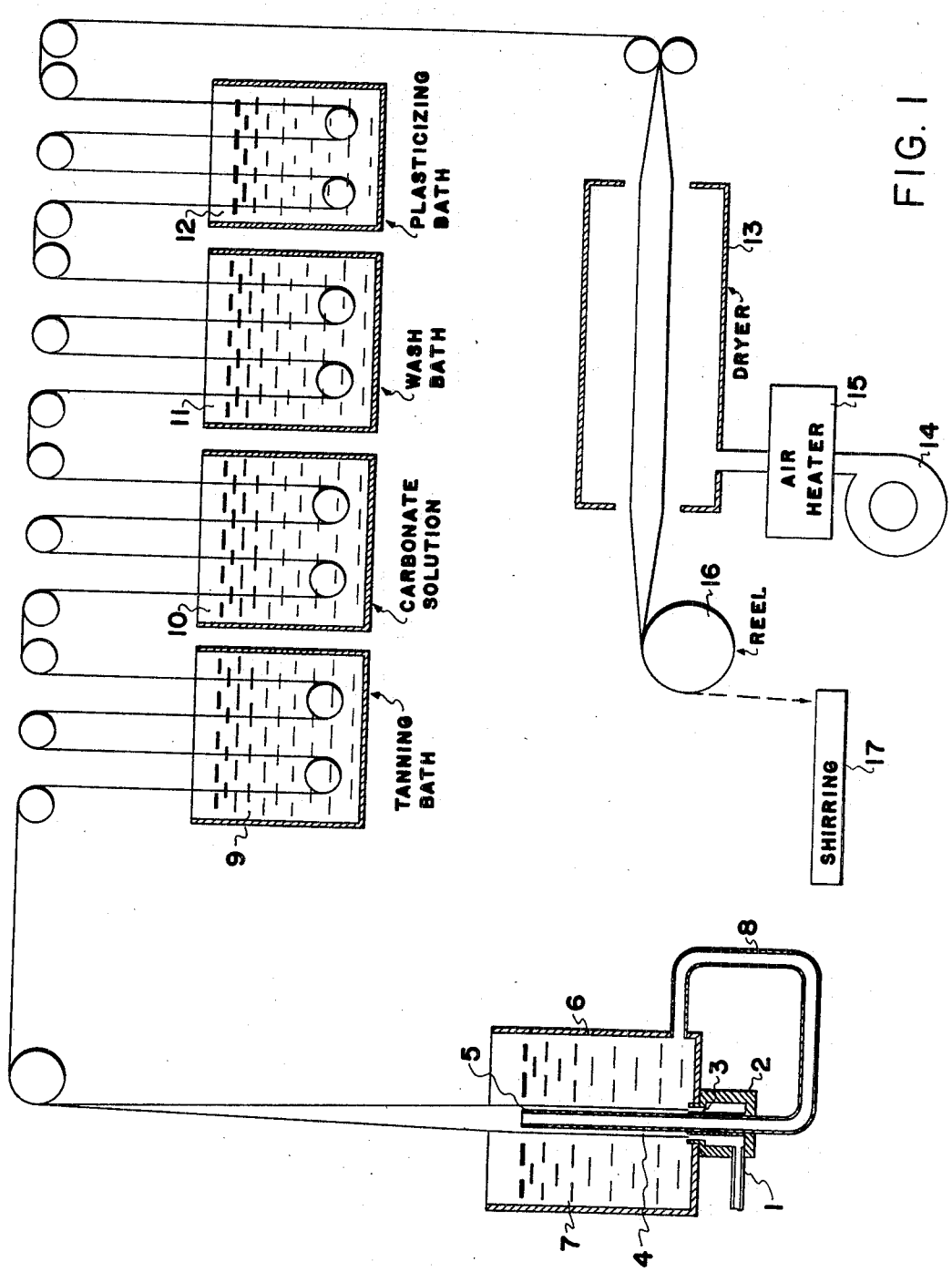

This invention relates to new and useful improvements in extruded collagen articles and more particularly to extruded collagen articles such as edible casings, surgical dressings, and the like which are formed in an expanded microporous condition.

Animal hide collagen is used extensively in the manufacture of surgical sutures, edible casings for use in the preparation of sausages of various kinds, and may be reconstituted in sheet form as a leather substitute. In the manufacture of reconstituted collagen articles for food or medical purposes, such as edible casings, sutures, sheet material for dressings, etc., special precautions are required in the preparation and handling of the collagen articles. Edible collagen casings particularly require special handling and the use of food grade chemical reagents at all stages in preparation.

In the preparation of food-grade or medical-grade extruded collagen articles, hide collagen is converted into a finely divided fibrillar form and extruded in the form of a dilute collagen slurry. The extruded collagen is passed into a sodium sulfate and/or amomnium sulfate coagulating bath which dehydrates the collagen slurry into a solid coherent collagen article. At this stage in the processing, however, the salt coagulated collagen article can be handled but will revert to a thin slurry upon contact with the water. It is therefore necessary to harden or tan the extruded collagen article to permit further processing of the article and to provide it with sufficient strentgh for its intended use. A satisfactory tanning process must utilize a food-grade or medical-grade tanning agent which is rapid in tanning action and completely nontoxic in the form in which it is present in the finished article. In some cases it is desirable to have a product in film or sheet form which is porous. Thus, the presence of micropores in an extruded tubular collagen casing may be desirable for transmission of fat from a sausage during cooking. Similarly, the presence of micropores in a collagen sheet material used for surgical dressings may be useful in permitting the dressing to breath.

It is therefore one object of this invention to provide a new and improved process for the preparation of extruded collagen articles having a microporous structure.

Another object is to provide new and improved porous extruded collagen articles.

A feature of this invention is the provision of an improved process for preparing porous extruded collagen articles by subjecting extruded and tanned collagen to treatment with a carbonate or bicarbonate salt and acid to produce a microporous structure in the product.

Another feature of this invention is the provision of new and improved microporous extruded collagen articles, such as an edible casing, porous sheet material, or film.

Other objects and features of this invention will become apparent from time to time throughout the specification and claims as hereinafter related.

Collagen tissues which are suitable for preparation of extruded collagen articles are obtainable from both hide and tendon, although hide collagen is preferred for edible casing manufacture. Collagen is formed of a large number of fibers which in turn consist of a much greater number of fibrils of submicroscopic size. Collagen fibers have a diameter of the order of 10 to 50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar tubular films.

It has been found recently that satisfactory edible collagen casings can be prepared using limed animal hides as the source of collagen. In fact, superior edible casings can be prepared in this manner. The animal hide is treated to remove the blood quickly and is frozen or salt cured or immediately treated with a lime containing solution to at least partially dehair the hide. The liming step (of the fresh, frozen, or salt-cured hide) must be carried out ordinarily in less than 48 hours and usually less than 12 hours (e.g. 3 hours or less). The hide is then washed, dehaired, ground at a temperature less than 20° C., and swollen with acid at a pH of 2.5–3.5. These steps should be carried out rapidly, viz less than 48 hours, preferably less than 12 hours. When the hide is limed, washed, ground, and swollen quickly, as described above, a strong edible casing can be prepared without the necessity of deliming the collagen.

As an alternative to the rapid processing of the collagen described above, the collagen may be treated with a dilute edible acid, such as lactic acid, acetic acid, or the like, and repeatedly squeezed and washed so that the excess, unreacted lime present in the collagen is neutralized and washed from the collagen. This neutralization is usually carried out prior to the final comminution of the collagen to form a slurry for extrusion. In neutralizing and removing the excess lime from the collagen a sequestering agent such as EDTA or a detergent, such as cationic, anionic, or nonionic detergent may be used to facilitate removal of the excess lime.

When an unlimed collagen source is used, the procedure followed is quite similar. The hide is swollen with acid such as lactic acid and is dehaired by scrapping or splitting. In such a procedure, the unlimed collagen material is then ground and swollen in acid to form an extrudable slurry.

The swollen collagen slurry which is produced by any of the procedures described above is extruded through a suitable die into a coagulating bath to form a salt-coagulated extrudate. When an edible casing is to be formed the collagen is extruded in the form of a tube. When a sheet material is formed the collagen is extruded through a slit. The collagen extrudate is then tanned, using a rapid, non-toxic tanning agent, washed, plasticized, dryed, and in the case of edible casings, is shirred and packaged. In carrying out the improved process of this invention the extruded and tanned collagen article is treated with a carbonate or bicarbonate salt and acid to cause the article to be formed with a microporous structure. In the case of edible casings or thin films or sheets of reconstituted collagen which may be used for surgical dressings the product is treated with carbonate or bicarbonate salts in aqueous solution just prior to the final wash step. The carbonate or bicarbonate salts react with the residual acid in the product from the coagulation step and generate carbon dioxide to form a microporous structure.

Figure 2:
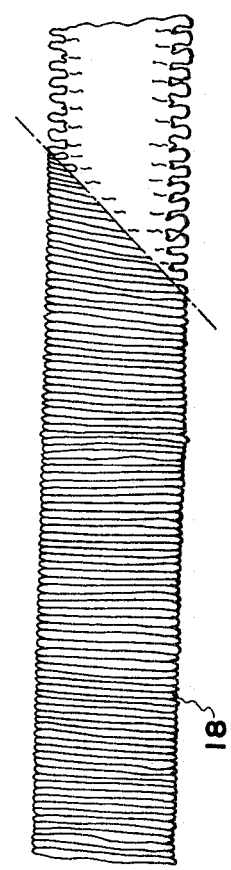
Figure 3:
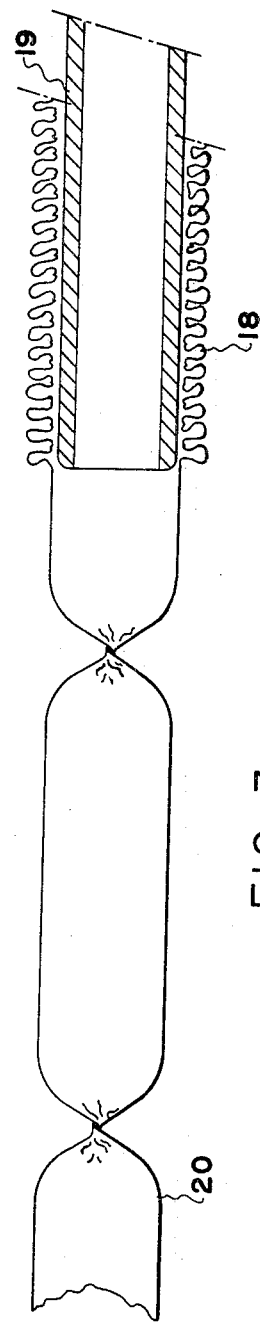

The process for preparation of casings and other extruded collagen materials in accordance with this invention will be understood more fully by reference to the following description and the accompanying drawings, in which:

FIG. 1 is a flow diagram illustrating schematically the more important steps in the extrusion, tanning, and processing of edible collagen casings, FIG. 2 is an extruded edible collagen casing prepared in accordance with this invention as processed in a shirred form, FIG. 3 is a schematic view showing the filling of the casing with sausage meat on an extrusion horn or nozzle and the preparation of sausage links therefrom.

In a preferred form of the process, animal hides are cut in suitable pieces (hide trimmings may also be used) and are treated with a suitable lime solution for removal of hair. The hide may also be limed before cutting into small pieces. The lime solution is preferably a solution containing excess solid lime, sodium sulfhydrate, and dimethylamine sulfate. After treatment in such a solution for a period of less than 2 days (3 to 12 hours or less is preferred), the hides are removed and washed. After washing, the hides are split or otherwise mechanically abraded to remove the epidermal layer and any remaining hair. Alternatively, the limed hides which have been treated for removal of the epidermal layer and hair may be treated with an edible, non-toxic acid to neutralize any excess lime and then subjected to washing, either with or without an added detergent or sequestering agent, to remove the excess lime. Also, it is possible to use hides which have been swollen with acid and the hair and epidermal layer split off without the initial liming step.

The hides which are thus prepared are ground into particles of very small size to produce an aqueous slurry having a collagen content in the range from about 2–6%, preferably about 3.5–5%. The collagen is maintained at a temperature less than about 20° C. (preferably less than 10° C.) during the grinding by repeated addition of ice to the mixture. The collagen slurry which is thus prepared is treated with a dilute solution of weak acid to swell and burst the collagen fibers as previously described. The washings, dehairing, grinding, and acid-swelling of the collagen are carried out as quickly as possible, preferably less than about 12–48 hours.

The swollen collagen slurry is then extruded through an annular die to produce a thin-walled tubular product suitable for use as sausage casings after tanning and further processing. If a sheet material is desired the collagen may be extruded through a slit. In order to obtain maximum strength in a casing made by this procedure, the collagen slurry is preferably extruded through a die having rotating inner and/or outer parts which is well known in the prior art in the preparation of collagen casing, vide Becker U.S. Pat. 2,046,541.

The collagen is extruded through the die into a coagulating bath consisting of a concentrated solution of sodium sulfate and/or ammonium sulfate. The collagen product which is formed, viz a thin-walled tubular casing or a sheet material, is then passed into a tanning bath, viz basic aluminum sulfate, basic ferric sulfate, or basic chromic sulfate, and subsequently washed and plasticized. The extruded product is treated with carbonate or bicarbonate salts in solution prior to washing which result in the formation of a microporous structure in the extruded material.

In FIG. 1 of the drawings, the steps from extrusion through reeling or shirring are illustrated schematically for the production of porous collagen casing. The collagen slurry is introduced through inlet conduit 1 into die 2 having an annular outlet 3 through which a tubular product or casing 4 is extruded. Die 2 has an inner tube 5 which extends upwardly within the extruded casing for introduction or withdrawal of coagulating bath from within the product. The die 2 is located at the bottom of container 6 which contains coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9.

Tanning bath 9 consists of an aqueous solution of any suitable nontoxic (i.e. non-toxic in the amounts retained in the product) tanning agent, e.g., basic aluminum sulfate, basic chromic sulfate, basic ferric sulfate, basic ferric ammonium sulfate, glutaraldehyde, formaldehyde, etc.

From the tanning bath 9, the casing passes through a bath 10 containing a carbonate or bicarbonate solution to neutralize residual acid in the casing and to create a microporous structure in the casing wall. The extent of porosity in the casing can be controlled somewhat by varying the concentration of the carbonate solution to vary the amount of carbon dioxide that is released within the wall of the casing and the rate of release of the carbon dioxide therein.

From the carbonate bath the casing passes through a wash bath 11 and thence to a plasticizing bath 12 which introduces a small amount of plasticizer such as glycerin into the casing. From plasticizing bath 12 the casing passes through dryer 13 where it is inflated and dried with the aid of air circulated by fan or blower 14 through air heater 15. After leaving dryer 13, the casing may be rolled upon reel 16 and subsequently shirred using an apparatus of the type used for shirring cellulose casings. Alternatively, the casing may be passed directly to a shirring machine shown diagrammatically as 17.

After the casing is shirred into individual short strands, it is packaged and cured by heating at about 60°–80° C. in an atmosphere of 20–50% relative humidity for several hours prior to shipment to the meat packer. If desired, the casing may be also moistened or humidified during the shirring process.

In FIG. 3 the stuffing of the casing is illustrated. A strand of edible collagen casing 18 is placed on a tubular stuffing horn 19 which is connected to a pressurized source of sausage emulsion (not shown). The sausage emulsion is passed through the stuffing horn 19 into the end of casing 18 and the casing filled with sausage meat and twisted at suitable intervals to provide sausage links 20. The links may be severed from each other and packaged in a suitable overwrap following conventional meat packaging techniques.

When the sausage is cooked by the consumer, the casing is found to be quite strong and shrinks with the meat during cooking. The casing may be prestuck, if desired, to permit more rapid release of fat during the cooking of the sausages. However, the porous condition of the casing resulting from the carbonate treatment tends to release some of the fat during cooking without the necessity of pre-sticking.

The following nonlimiting examples are illustrative of the application of this invention in the preparation of an edible collagen casing.

EXAMPLE 1

In this example, the preparation of porous edible collagen casings from limed animal hides with ferric salt tanning is illustrated. Fresh heifer hides are limed for a period of 3 hours at 10° C. in a liming solution equal to 300% of the weight of the hide being treated. The solution contains 5% lime, 1% sodium sulfhydrate, and 3% dimethylamine sulfate based on the weight of the hide treated. Ate the end of the 3-hour treatment, the hair is substantially loosened and partially removed.

The hide is washed to remove excess liming solution and then is defleshed and split (or mechanically abraded) to remove the remaining hair and epidermal layer. Next, the hide splits are cut into small square or rectangular pieces, e.g., ¼–4 inches of a side, in preparation for grinding.

The small pieces of treated hide are converted to a fine pulp by successive passes through a meat grinder. In this grinding operation, sufficient ice is mixed with the hide splits to maintain the temperature below about 20° C. (preferably below 10° C.). Successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute lactic acid (other dilute or weak acids may be used) to produce a pH of about 2.5–3.7. After thorough mixing, the pulp and acid are stored overnight at a temperature of about 3° C. to swell. At the end of this time, the collagen has swollen and taken up all of the water in the slurry. The swollen collagen is mixed with sufficient additional water and acid to maintain a pH of 2.5–3.7 producing a thin homogeneous paste consisting of approximately 4% collagen and 1.2% lactic acid. This paste is further homogenized, filtered to remove any solid contaminants, and deaerated. The process, form the washing of the limed hide through the acid-swelling of the comminuted collagen, is carried out in a relatively short period of time, preferably about 6 to 12 hours or less.

The acid swollen slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 1 of the drawings, the coagulation bath is circulated both inside and outside the tube to maintain the tube in an inflated condition and to insure proper coagulation of the casing both on the inside and outside.

After the film is coagulated in the ammonium sulfate solution, it is passed through a tanning bath comprising a solution of 10% ferric ammonium sulfate and 20% ammonium sulfate. In this bath, the casing is tanned or hardened. The casing passes over a series of rollers in the tanning bath to provide multiple passes giving a residence time of at least one minute in the bath. From the tanning bath, the casing passes into a carbonate or bicarbonate solution (about 0.2% concentration) to complete the neutralization of the casing and produce a microporous structure by release of carbon dioxide throughout the wall of the casing. Next, the casing is washed and plasticized as previously described. Finally, the casing is dried in an inflated condition by air maintained at a temperature of about 70° C. and circulated at a rate of 200 feet per minute.

Casing which is prepared in this manner is quite strong and is porous and soft. The casing is found to be much softer and more flexible than casing prepared without the carbonate treatment. The casing is generally satisfactory for encasing sausage products. Casings prepared by this method are uniform in diameter and wall thickness and are formed of a smooth film substantially free of collagen fibers of microscopic size. The casing film is translucent and apparently formed of collagen fibrils that are essentially randomly oriented. This casing can be shirred without difficulty using a shirring machine of a type used for shirring of regenerated cellulose casing. The shirred casing can be stuffed and linked without difficulty.

When this procedure is repeated, substituting basic aluminum sulfate for the basic ferric ammonium sulfate the casing which is produced is a satisfactory edible collagen casing. When the process is used for the extrusion of tubes which are subsequently to be split for preparation of film sheets for use as tapes or surgical dressings other tanning agents, such as basic chromic sulfate, may be used which are not permitted in the manufacture of edible casings.

While this invention has been described fully and completely with special emphasis upon several preferred embodiments it should be understood that within the scope of the appended claims the invention may be practiced otherwise than as specifically described herein.

What is claimed is:
1. In a method of producing a porous extruded collagen article which comprises in combination:
 (a) defleshing an animal hide and removing the epidermal layer and hair therefrom,
 (b) cutting the hide into pieces,
 (c) grinding the hide pieces at a temperature less than 20° C. and producing a slurry of finely divided collagen in water,
 (d) chemically treating the slurry to acid swell the collagen,
 (e) extruding the collagen slurry to produce the desired shape,
 (f) coagulating the extruded collagen,
 (g) tanning the extruded collagen, and
 (h) washing, plasticizing, and drying the collagen product,
   the improvement which comprises, after tanning the extruded collagen and prior to finally washing the extruded collagen, contacting and reacting a carbonate or bicarbonate salt solution with an acid within the extruded and tanned collagen to release carbon dioxide and form micropores therein, the acid reacted with the carbonate or bicarbonate salt solution comprising residual acid present in the coagulated and tanned collagen.

2. A method in accordance with claim 1 in which the collagen is extruded as a thin-walled edible food casing.

3. A method in accordance with claim 1 in which the collagen is extruded as a non-tubular film or sheet.

References Cited

UNITED STATES PATENTS

| 1,427,330 | 8/1922 | Rousset | 264—54 |
| 2,000,835 | 5/1935 | Goldberger | 99—176 |
| 2,202,566 | 5/1940 | Schulte | 128—270 |
| 2,492,425 | 12/1949 | Hall et al. | 264—54 |
| 3,123,653 | 3/1964 | Lieberman | 99—175 |
| 3,373,046 | 3/1968 | Fagan | 99—175 |

A. LOUIS MONACELL, Primary Examiner

W. C. LAWTON, Assistant Examiner

U.S. Cl. X.R.

99—176; 128—296; 264—54